(12) United States Patent
Mychajlowskij et al.

(10) Patent No.: US 6,348,561 B1
(45) Date of Patent: Feb. 19, 2002

(54) SULFONATED POLYESTER AMINE RESINS

(75) Inventors: Walter Mychajlowskij, Mississauga; Daniel A. Foucher, Toronto; Raj D. Patel; Guerino G. Sacripante, both of Oakville, all of (CA)

(73) Assignee: Xerox Corporation, Stamford, CT (US)

( * ) Notice: Subject to any disclaimer, the term of this patent is extended or adjusted under 35 U.S.C. 154(b) by 10 days.

(21) Appl. No.: 09/838,407

(22) Filed: Apr. 19, 2001

(51) Int. Cl.$^7$ ............................................... C08G 63/44
(52) U.S. Cl. ...................... 528/288; 528/274; 528/295; 528/300; 528/301; 528/302; 528/306; 528/308; 528/308.6; 528/335
(58) Field of Search ................... 528/274, 295, 528/288, 300, 301, 302, 306, 307, 308, 308.6, 335

(56) References Cited

U.S. PATENT DOCUMENTS

| | | |
|---|---|---|
| 5,278,020 A | 1/1994 | Grushkin et al. ............ 430/137 |
| 5,290,654 A | 3/1994 | Sacripante et al. ......... 430/137 |
| 5,308,734 A | 5/1994 | Sacripante et al. ......... 430/137 |
| 5,344,738 A | 9/1994 | Kmiecik-Lawrynowicz et al. ..... 430/137 |
| 5,346,797 A | 9/1994 | Kmiecik-Lawrynowicz et al. ..... 430/137 |
| 5,348,832 A | 9/1994 | Sacripante et al. ......... 430/109 |
| 5,364,729 A | 11/1994 | Kmiecik-Lawrynowicz et al. ..... 430/137 |
| 5,366,841 A | 11/1994 | Patel et al. ................. 430/137 |
| 5,370,963 A | 12/1994 | Patel et al. ................. 430/137 |
| 5,403,693 A | 4/1995 | Patel et al. ................. 430/137 |
| 5,405,728 A | 4/1995 | Hopper et al. .............. 430/137 |
| 5,418,108 A | 5/1995 | Kmiecik-Lawrynowicz et al. ..... 430/137 |
| 5,496,676 A | 3/1996 | Croucher et al. ........... 430/137 |
| 5,501,935 A | 3/1996 | Patel et al. ................. 430/137 |
| 5,527,658 A | 6/1996 | Hopper et al. .............. 430/137 |
| 5,585,215 A | 12/1996 | Ong et al. .................. 430/107 |
| 5,593,807 A | 1/1997 | Sacripante et al. ......... 430/137 |
| 5,650,255 A | 7/1997 | Ng et al. .................... 430/137 |
| 5,650,256 A | 7/1997 | Veregin et al. ............. 430/137 |
| 5,840,462 A | 11/1998 | Foucher et al. ............. 430/137 |
| 5,853,944 A | 12/1998 | Foucher et al. ............. 430/137 |

*Primary Examiner*—Samuel A. Acquah
(74) *Attorney, Agent, or Firm*—E. O. Palazzo

(57) ABSTRACT

An alkali sulfonated polyester-amine resin generated from the reaction of an organic diol, and a mixture of an organic diacid, an alkali sulfonated diacid and an amino-organic diacid.

28 Claims, No Drawings

SULFONATED POLYESTER AMINE RESINS

COPENDING APPLICATIONS

Illustrated in copending application U.S. Ser. No. 09/838,636, filed concurrently herewith, the disclosure of which is totally incorporated herein by reference, is a toner composition comprised of colorant and an alkali sulfonated polyester-amine resin composition generated from the reaction of an organic diol, an organic diacid, an alkali sulfonated diacid, and an amino-organic diacid.

Illustrated in copending application U.S. Ser. No. 09/838,612, filed concurrently herewith, the disclosures of which is totally incorporated herein by reference, is an ink composition comprised of a vehicle, a colorant and an alkali sulfonated polyester-amine resin generated from the reaction of an organic diol, an organic diacid, an alkali sulfonated diacid, and an amino-organic diacid.

BACKGROUND OF THE INVENTION

The present invention is generally directed to polymeric resin compositions and processes thereof, and more specifically, to novel sulfonated polyester-amine resins, and which resins can be selected for dry toners, inks such as ink jet inks, and/or colorant, such as pigment dispersants. The aforementioned toners or inks can be selected as marking materials in, for example, a number of xerographic printers, copiers, ink jet printers, fax machines, and the like. In embodiments of the present invention there are provided dry toner compositions comprised of a sulfonated polyester-amine resin, and colorant particles comprised of, for example, carbon black, magnetite, cyan, magenta, yellow, blue, green, or mixtures thereof thereby providing for the development and generation of black and/or colored images; inks that can be selected for ink jet printing, thermal ink jet printing, acoustic ink jet printing and the like, and which ink composition is comprised of a sulfonated polyester-amine resin, a vehicle such as water, glycols mixture thereof and the like, and a colorant such as a dye or pigment, thereby providing, for example, developed images with excellent waterfastness and low smear print quality colorant; a pigment dispersant comprised of a sulfonated polyester-amine resin, and which dispersion is utilized in inks formulations or toner compositions, especially compositions prepared by chemical processes, such as emulsion aggregation process and the like, thereby providing an excellent colorant dispersion and high projection efficiency; and a sulfonated polyester-amine resin of, for example, the following formula, and processes for the preparation thereof by, for example, melt condensation wherein M is a suitable metal, such as an alkali such as sodium, potassium, or lithium, or a hydrogen atom; Y is an alkylene inclusive of alkyleneoxyalkylenes, each with, for example, from about 2 to about 25 carbon atoms, such as ethylene, propylene, 1,2-propylene, propylene oxy propylene, or 1,2-butylene; X is an arylene with, for example, from about 7 to about 30 carbon atoms, such as 1,2-phenylene, 1,3-phenylene or 1,4-phenylene, or an alkylene; and m, n and o each represent the number of random segments wherein random refers, for example, to the segments m, n and o that do not follow an algorithmic pattern, that is these segments usually follow no pattern as opposed to alternating or block.

The sulfonated polyester-amine resin can be selected as a colorant dispersant, and for toners and inks, which can be employed in known electrophotographic imaging, digital, printing processes, including color processes, ink jet, and lithography. Toners comprised of the aforementioned sulfonated polyester amine are especially useful for the development of colored images with excellent line and solid resolution, and wherein substantially no background deposits are present, and wherein excellent toner electrical stability is retained after multiple printing such as from about 500,000 to 1,000,000 print cycles. Additionally, inks comprised of the sulfonated polyester-amine possess excellent print quality attributes, such as low smear of, for example, less than about a 0.2 change in optical density values after smearing, and excellent waterfastness such as about 90 to about 95 percent on plain papers. Moreover, when the aforementioned resins are utilized as a colorant like pigment dispersant, the dispersant can be selected to prepare chemical toners, such as for example emulsion aggregation toners as disclosed in U.S. Pat. No. 5,593,807, the disclosure of which is totally incorporated herein by reference, and wherein the colorants stabilized by the sulfonated polyester amine provide excellent colorant dispersants of small particle diameter size of between about 20 to about 300 nanometers, and more specifically, between about 50 to about 150 nanometers, thus resulting in high image projection efficiencies, especially on transparency media, such as from about 90 to about 100 percent as measured by the Match Scan II by Milton-Roy.

In embodiments of the present invention, the sulfonated polyester amine resin can be utilized for the preparation of aqueous based pigment dispersions, that is, pigments or colorants dispersed in an aqueous environment and stabilized with a resin, such as the sulfonated polyester amine resin of the present invention, which dispersion is stable and does not usually settle out or aggregate during storage, and wherein the stable dispersion can be utilized for the preparation of chemical toners or inks. Advantages associated

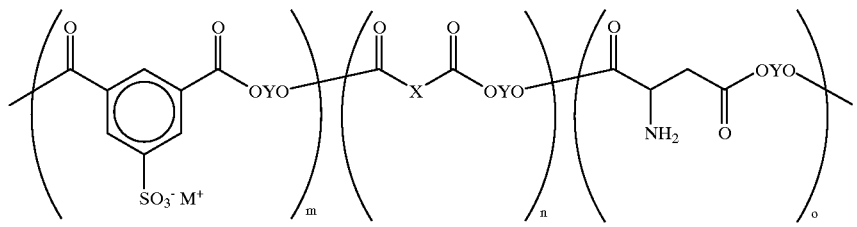

with colorant dispersions are that excellent and substantially complete dispersion within the toners are obtained, thus leading to developed images of high projection efficiency, and wherein the transparency projection efficiency obtained is, for example, from about 90 to about 100 percent as measured by the Match Scan II spectrophotometer from Milton-Roy.

In yet another embodiment of the present invention, the sulfonated polyester-amine resins can be selected for inks utilized in ink jet piezoelectric printers. One of the continuing shortfalls in current ink jet products is excellent waterfastness and low smear. For dyes in particular, this has largely been overcome through the introduction of waterfastness agents, such as polyelectrolytes, for example Calgon and related poly(diallyldiethylammonium) bromide materials. In the present invention, the use of amine containing sulfonated polyester resins readily form ammonium-sulfate ionic salts by pH adjustment. These water dispersible polymeric cationic salt complexes fix or attach to plain papers and enable excellent waterfastness and low smear properties.

The sulfonated polyester-amine resins can, as indicated hereinbefore, be utilized for the preparation of toners, and more specifically, toners generated by emulsion aggregation process such as illustrated in U.S. Pat. Nos. 5,593,807; 5,840,462, and 5,853,944, the disclosures of which are totally incorporated by reference. More specifically, in embodiments, the polyester resins are useful in the preparation of small average toner particle sizes of, for example, from about 3 microns to about 9 microns, and about 5 microns in volume average diameter without resorting to classification processes, and wherein narrow geometric size distributions are attained, such as from about 1.16 to about 1.30, and more specifically, from about 1.18 to about 1.25. High toner yields also result, such as from about 90 percent to about 98 percent in embodiments of the present invention.

Illustrated in the above mentioned U.S. Pat. No. 5,593, 807, the disclosure of which is totally incorporated herein by reference in its entirety, is a process for the preparation of toner compositions comprising, for example, (i) preparing an emulsion latex comprised of sodio sulfonated polyester resin particles of from about 5 to about 500 nanometers in size diameter by heating said resin in water at a temperature of from about 65° C. to about 90° C.;

(ii) preparing a pigment dispersion in water by dispersing in water from about 10 to about 25 weight percent of sodio sulfonated polyester and from about 1 to about 5 weight percent of pigment;

(iii) adding the pigment dispersion to the latex mixture with shearing, followed by the addition of an alkali halide in water until aggregation results, for example, by an increase in the latex viscosity of from about 2 centipoise to about 100 centipoise;

(iv) heating the resulting mixture at a temperature of from about 45° C. to about 55° C. thereby causing further aggregation and enabling coalescence, resulting in toner particles of from about 4 to about 9 microns in volume average diameter and with a geometric distribution of less than about 1.3; and optionally (v) cooling the product mixture to about 25° C. and followed by washing and drying. The toners of this patent may possess disadvantages in that, for example, the use of such toners in high speed printers results in a decrease in the developer stability and developer lifetimes due primarily to triboelectric charge loss, especially after multiple print cycles of about 100,000 to about 300,000. These and other disadvantages and problems are minimized, or avoided with the sulfonated polyester amine toner resins of the present invention, and wherein the developer life is extended beyond 500,000 print cycles, and more specifically, up to about 1,000,000 print cycles.

PRIOR ART

Numerous processes are known for the preparation of toners, such as, for example, conventional toner polyester processes wherein a resin is melt kneaded or extruded with a pigment, micronized and pulverized to provide toner particles with a volume average particle diameter of from about 9 microns to about 20 microns, and with a broad geometric size distribution of from about 1.26 to about 1.5. In these processes, it is usually necessary to subject the aforementioned toners to a classification procedure such that a toner geometric size distribution of from about 1.2 to about 1.4 is attained. Also, in the aforementioned conventional process, low toner yields after classifications may be obtained. Generally, during the preparation of toners with average particle size diameters of from about 11 microns to about 15 microns, toner yields range from about 70 percent to about 85 percent after classification. Additionally, during the preparation of smaller sized toners with particle sizes of from about 7 microns to about 10 microns, lower toner yields may be obtained after classification, such as from about 50 percent to about 70 percent. In some instances, when the aforementioned toners are utilized in high speed reprographic engines, wherein multiple prints are provided, the developer is constantly refreshed with toner, and after prolonged usage, such as from about 100,000 to about 300,000 copy or print cycles, the image quality may be deficient due to triboelectrical charge loss of the developer. There is thus a need for toner compositions minimized or avoided whereby the resin component has a built-in charge such that tribo loss is in a developer, especially after about 300,000 print cycles, and up to about 1,000,000 print cycles. In the present invention, this deficiency is overcome by the utilization of a charged toner resin, such as a sulfonated polyester amine, and wherein the amine moiety and sodio-sulfonated moiety provide stable triboelectric charge to the developer utilized in, for example, a reprographic machine.

In U.S. Pat. No. 5,290,654, the disclosure of which is totally incorporated herein by reference, there is illustrated a process for the preparation of toners comprised of dispersing a polymer solution comprised of an organic solvent and a polyester, and homogenizing and heating the mixture to remove the solvent and thereby form toner composites.

Emulsion/aggregation/coalescing processes for the preparation of toners are illustrated in a number of Xerox patents, the disclosures of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797; and also of interest may be U.S. Pat. Nos. 5,348,832; 5,405,728; 5,366,841; 5,496,676; 5,527,658; 5,585,215; 5,650,255; 5,650,256 and 5,501,935.

The appropriate components and processes of these Xerox Corporation patents may be selected for the present invention in embodiments thereof.

SUMMARY OF THE INVENTION

It is a feature of the present invention to provide a resin composition and processes thereof with many of the advantages illustrated herein.

It is another feature of the present invention to provide a sulfonated polyester-amine resin composition and processes thereof with many of the advantages illustrated herein.

In another feature of the present invention there is provided a melt condensation process for the preparation of a sulfonated polyester-amine resin.

Further, in a feature of the present invention there is provided a melt condensation process for the preparation of a sulfonated polyester-amine resin derived from an organic diol and mixture of organic diacid.

In an added feature of the present invention, there is provided a melt condensation process for the generation of a sulfonated polyester-amine resin, wherein the organic diol selected is ethylene glycol, propylene glycol, diethylene glycol, dipropylene glycol, mixtures thereof and the like, and which diol is selected in an amount of, for example, from about 0.45 to about 0.55 mole percent of the sulfonated polyester-amine resin.

In yet another feature of the present invention there is provided a melt condensation process for the preparation of a sulfonated polyester-amine resin, wherein the organic diacid mixture selected is comprised of from about 80 to about 95 parts or percent of organic diacid, such as terephthalic acid of from about 1 to about 10 parts or percent of a sodiosulfonated organic diacid such as sodio 5-sulfoisophthalic acid, and from about 0.5 to about 15 parts or percent of amine containing organic diacid such as aspartic acid.

Moreover, in a feature of the present invention there are provided sulfonated polyester-amine resins selected for the preparation of black and colored toner compositions.

Another feature of the present invention resides in the provision of a sulfonated polyester-amine resin for the generation of black and colored ink compositions.

In yet another feature of the present invention there are provided sulfonated polyester-amine resins for the generation of a heat and cold resistant, long shelf life, such as from about 30 to about 360 days, of stable black and colored dye or pigmented aqueous dispersions.

Also, in another feature of the present invention there are provided simple and economical in situ processes for the generation of black and colored dry toner compositions by an emulsion aggregation process, and wherein a sulfonated polyester-amine is selected as the resin, and wherein the resulting toner displays a volume average diameter of, for example, from between about 1 to about 20 microns, and more specifically, from about 1 to about 7 microns in volume average diameter, and with a narrow GSD of, for example, from about 1.15 to about 1.35, and more specifically, from about 1.14 to about 1.22 as measured by a Coulter Counter.

In a further feature of the present invention there is provided a process for the preparation of sulfonated polyester-amine containing toner compositions by melt mixing, kneading or extrusion processes, and which toner possesses a volume average diameter of from between about 1 to about 20 microns, and preferably from about 1 to about 7 microns in volume average diameter, and with a narrow GSD of, for example, from about 1.25 to about 1.35 as measured by a Coulter Counter.

Additionally, in a further feature of the present invention there is provided a sulfonated polyester-amine based toner for high speed reprographic printing apparatus with excellent developer life, such as from about 500,000 to about 1,000,000 cycles, without or with minimum development loss associated with charge in stability.

Also, in a further feature of the present invention there is provided a process for the preparation of ink compositions containing a sulfonated polyester-amine.

In yet a further feature of the present invention there is provided a process for the preparation of ink compositions with a sulfonated polyester-amine, and which inks permit excellent waterfastness and low smear print quality.

Moreover, in a further feature of the present invention there is provided an economical process for the preparation of aqueous colorant dispersions comprised of a sulfonated polyester-amine and a dye or pigment, and wherein the colorant dispersion emulsion can be aggregated and coalesced with complexing agents like diamines, trialkyl amines, divalent metal salts, polyelectrolytes, dendrimers, iron complexes, cobalt complexes, and the like.

In another feature of the present invention there is provided a composite toner of polymeric resin with colorant, and a sulfonated polyester-amine pigment dispersion, which toner enables a high projection efficiency, such as from about 950 to about 99 percent as measured by the Match Scan II spectrophotometer available from Milton-Roy.

These and other features of the present invention are accomplished in embodiments by the provision of a sulfonated polyester-amine resins and process thereof.

Aspects of the present invention—Jean to copy the final claims here; a sulfonated polyester-amine resin contained in a toner or ink composition, and which resin is generated by the melt condensation reaction of an organic diol and a mixture of organic diacids comprised of from about 80 to about 95 parts percent of organic diacid, such as terephthalic acid, from about 1 to about 10 parts percent of a sodiosulfonated organic diacid, such as sodio 5-sulfoisophthalic acid, and from about 0.5 to about 15 parts percent of amine containing organic diacid, such as aspartic acid, and wherein the total amount of diacids is about 100 part percent; sulfonated amine polyester resins which contain sulfonated groups thereby rendering them dissipatible, that is, they form spontaneous emulsions in water without the use of organic solvents, especially above the glass transition temperature, Tg, of the polyester resin, and which resin also contains a number of amine moieties, thereby enabling excellent toner stable triboelectric performance, the ability to form cationic complexes with the sulfate moiety and thus permitting the ink jet print quality performance improvements; and a sulfonated polyester-amine resin obtained by a melt condensation process comprised of charging a reactor equipped with a mechanical stirrer and distillation apparatus with from about 95 to about 105 mole percent of a glycol, such as propylene glycol, diethylene glycol, dipropylene glycol or mixtures thereof, with from about 35 to about 40 mole percent of an organic diacid, such as terephthalic acid, from about 5 to about 15 mole percent of a sulfonated organic diacid, such as sodio 5-sulfoisophthalic acid or dimethyl 5-sulfo-isophthalate sodium salt, and from about 0.5 to about 15 mole percent of amine containing organic diacid, such as aspartic acid, and wherein the total organic diacid amount is from about 48 to about 52 mole percent, and a polycondensation catalyst, such as stannic acid or tetrabutyl titanate, selected in an amount of from about 0.005 to about 0.5 mole percent. The reactor contents are then heated to a temperature of from about 150° C. to about 190° C., and wherein water or alcohol is distilled off during a period of from about 3 to about 6 hours. Thereafter, the temperature is increased to from about 205° C. to about 220° C., and the pressure is reduced from atmospheric pressure to about 1 mm-Hg over a duration of, for example, from about 3 to about 6 hours, during which water or alcohol and the excess glycol are distilled off. The pressure of the reaction is then reverted back to atmospheric pressure and the contents discharged through a bottom drain of the reactor to provide a sodiosulfonated polyester-amine resin, such as a random copoly(1,2-propylene-terephthalate)-copoly(1,2-propylene-sodio 5-sulfo-isophthalate)-copoly(1,2-propylene-aspartate), with a glass transition temperature of, for example, from about 50° C. to about 65° C., a number average molecular weight of from about 2,000 to about 50,000 grams per mole, a weight average molecular weight of from about 5,000 to about 100,000 grams per mole, and a polydispersity of, for example, from about 2 to about 30.

Examples of sulfonated polyester-amines generated with the processes of the present invention include, but are not limited to, copoly(1,2-propylene-terephthalate)-copoly(1,2-propylene-sodio 5-sulfoisophthalate)-copoly(1,2-propylene-aspartate), copoly(neopentylene-terephthalate)-copoly(neopentylene-sodio 5-sulfoisophthalate)-copoly(neopentylene-aspartate), copoly(1,2-propylene-ethyleneoxyethylene-terephthalate)-copoly(1,2-propylene-ethyleneoxyethylene-sodio 5-sulfoisophthalate)-copoly(1,2-propylene-ethyleneoxyethylene-aspartate), copoly(1,2-propylene-terephthalate)-copoly(1,2-propylene-potasio 5-sulfoisophthalate)-copoly(1,2-propylene-aspartate), copoly(neopentylene-terephthalate)-copoly(neopentylene-potasio 5-sulfoisophthalate)-copoly(neopentylene-aspartate), and copoly(1,2-propylene-ethyleneoxyethylene-terephthalate)-copoly(1,2-propylene-ethyleneoxy ethylene-potasio 5-sulfoisophthalate)-copoly(1,2-propylene-ethyleneoxyethylene-aspartate).

Examples of organic diols utilized in preparing the aforementioned polyesters of the present invention include diols or glycols, such as alkylene glycols with a carbon chain length of, for example, from about 1 to about 25 carbon atoms, and more specifically, ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, hexylene glycol, heptalyne glycol, diethylene glycol, dipropylene glycol, cyclohexane diol, 2,2-dimethyl propane diol, neopentylene glycol, octylene glycol, cyclohexane dimethanol, mixtures thereof, and the like; and which glycols are employed in various effective amounts of, for example, from about 45 to 55 mole percent of the resin product.

Various organic diacids or esters of diacids can be selected to form the amine resin products of the present invention, such as those selected from the group consisting of fumaric acid, malonic acid, itaconic acid, 2-methylitaconic acid, maleic acid, maleic anhydride, adipic acid, succinic acid, suberic acid, 2-ethyl succinic acid, glutaric acid, dodecylsuccinic acid, 2-methyladipic acid, pimelic acid, azelaic acid, sebacic acid, terephthalic acid, isophthalic acid, phthalic acid, 1,2-cyclohexanedioic acid, 1,3-cyclohexanedioic acid, 1,4-cyclohexanedioic acid, dialkyl esters wherein alkyl contains from about 2 to about 22 carbon atoms, and are esters of malonate, succinate, fumarate, itaconate, terephthalate, isophthalate, phthalate, cyclohexanedioate, and mixtures thereof, and which diacids are optionally selected in an amount of from 35 mole percent to about 0.45 mole percent based on about 100 mole percent of resin product.

Examples of sulfonated organic diacids or esters of diacids include those selected from the group comprised of sodio 5-sulfoisophthalic acid, potasio 5-sulfoisophthalic acid, sodio 2-sulfoterephthalic acid, potasio 2-sulfoterephthalic acid, dimethyl 5-sulfoisophthalate sodium salt, dimethyl 5-sulfoisophthalate potassium salt, and mixtures thereof, and which diacids are optionally selected in an amount of from 1 mole percent to about 10 mole percent, based on about 100 mole percent of resin product.

Amine containing organic diacid or esters of diacids selected for the resin processes illustrated herein include, for example, aspartic acid, dimethyl aspartate, diethyl aspartate, dipropyl aspartate and the like, and which diacids are optionally selected in an amount of from 1 mole percent to about 10 mole percent, based on about 100 mole percent of the resin product.

The transesterification or polycondensation catalyst utilized for the preparation of the invention polyester amine, and which catalyst is an optional component, is selected, for example, from the group consisting of tetraalkyl titanates, dialkyltin oxide, such as dibutyltin oxide hydroxide or stannic acid available as FASCAT 4100 from Elf Atochem, aluminum alkoxide, alkyl zinc, dialkyl zinc, zinc oxide, stannous oxide, or mixtures thereof and the like, and which catalyst can be selected in an amount of, for example, from about 0.001 mole percent to about 0.01 mole percent, based on about 100 mole percent of resin product.

In some instances, colorants, such as pigments available in the wet cake form or concentrated form containing water, can be easily dispersed in the polyester sulfonate amine resin product illustrated herein utilizing a homogenizer or stirring to form the dispersion; or there can be selected colorants which are available in a dry form to permit a dispersion in water effected by microfluidizing using, for example, an M-110 microfluidizer and passing the colorant or colorant dispersion from about 1 to about 10 times through the chamber of the microfluidizer, or by sonication, such as using a Branson 700 sonicator, with from about 1 to about 10 weight percent of the sodiosulfonated polyester-amine resin. The resulting colorant dispersion can be utilized to generate toners by an emulsion aggregation process, such as the processes, for example, disclosed in U.S. Pat. No. 5,840,462, the disclosure of which is totally incorporated herein by reference.

Various known colorants or pigments present in the toner in an effective amount of, for example, from about 1 to about 25 percent by weight of the toner, and more specifically, in an amount of from about 1 to about 15 weight percent, that can be selected include carbon black like REGAL 330®; and other known suitable carbon blacks; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are cyan, magenta, or yellows, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. These colorants selected are present in various effective amounts as indicated herein, and generally from about 1 weight percent to about 65 weight, and more specifically, from about 2 to about 12 percent of the toner. Many, and in embodiments all, of the aforementioned pigments can be selected for the formulation of inks.

Colorants include dyes such as known dyes like food dyes, pigments, mixtures thereof, mixtures of pigments, mixtures of dyes, and the like.

Surface additives that can be added to the dry toner composition after isolation by, for example, filtration, and then optionally followed by washing and drying include, for example, metal salts, metal salts of fatty acids, metal oxides, colloidal silicas, titanium oxides, mixtures thereof, and the like, which additives are each usually present in an amount of from about 0.1 to about 2 weight percent, reference U.S. Pat. Nos. 3,590,000; 3,720,617; 3,655,374 and 3,983,045, the disclosures of which are totally incorporated herein by reference. Specific additives include zinc stearate, silicas, such as AEROSIL R972®, and other silicas available from Cabot Corporation or Degussa Company. These additives can each be selected in amounts of, for example, from about 0.1 to about 2 percent, and which additives can be incorporated during aggregation, or blended into the formed toner product. The toner may also include known charge additives in effective amounts of, for example, from about 0.1 to about 5 weight percent, such as alkyl pyridinium halides, bisulfates, the charge control additives of U.S. Pat. Nos. 3,944,493; 4,007,293; 4,079,014; 4,394,430 and 4,560,635, the disclosures of each of these patents being totally incorporated herein by reference, negative charge enhancing additives like aluminum complexes, and the like. Other known positive and negative enhancing charge additives may also be selected.

Developer compositions can be prepared by mixing the toners obtained with the processes of the present invention with known carrier particles, for example from about 2 percent toner concentration to about 8 percent toner concentration, including coated carriers, such as steel, ferrites, and the like, reference U.S. Pat. Nos. 4,937,166 and 4,935,326, the disclosures of which are totally incorporated herein by reference. The carrier particles may also be comprised of a carrier core with a polymer coating, or coatings thereover, and dispersed therein a conductive component like a conductive carbon black in an amount, for example, of from about 5 to about 60 weight percent.

Imaging methods are also envisioned with the toners of the present invention, reference for example a number of the patents mentioned herein, and U.S. Pat. Nos. 4,265,660; 4,585,884; 4,563,408 and 4,584,253, the disclosures of which are totally incorporated herein by reference.

The present invention in embodiments is also directed to ink compositions and processes thereof, and wherein the disclosed sulfonated polyester-amine resins are selected, and wherein the inks and developed images thereof possess excellent waterfastness of, for example, from about 95 to about 99 percent, as measured by water soaking prints, and evaluating changes in optical density; high lightfastness values wherein, for example, extended exposure of developed prints in light box exposed to Xenon lamp evidence no or minimal change in optical density or color change as measured with a color densitometer; low smear values of, for example, between about 0.01 to about 0.25, and more specifically, about 0.01 to about 0.15 as measured using a wet smear fixture capable of providing a constant pressure across a printed page; low product cost where the final cost of the resin and pigment is substantially less costly (about 10 to about 40 percent) than a number of commercially available products; high image ink resolution from printheads capable of delivering 1200×1200 dpi resolution or higher; excellent print quality in terms of high optical densities of between about 1.4 to about 1.7 for black and between about 0.7 to about 1.3 for color; minimal ink line edge raggedness of between about 0.1 to about 6, and low ink intercolor bleed values of between about 5 to about 20, and more specifically, between about 5 to about 15 on a variety of substrates as measured using an HR camera; excellent ink jetting capability with high drop velocity; excellent latency of between about 50 to about 500 seconds for first drop; larger ink drop mass or drop volume which provides optimal optical density in a single pass; high frequency of between about 12 to about 24 KHz, and more specifically, between about 15 to about 24 KHz response which allows for high speed printing; excellent ink printhead recoverability and maintainability; excellent ink stability; minimal ink and colorant settling; a substantial lack of printhead kogation, and wherein the inks when selected for ink jet processes enables the minimization of paper curl, and wherein smearing is avoided or minimized.

The inks can be comprised of a vehicle, a colorant, a sulfonated polyester-amine resin and optionally humectants, surfactants and other known or to be developed ink additives.

Liquid ink vehicle examples include water, a mixture of water and a miscible organic component, such as glycols like ethylene glycol, propylene glycol, diethylene glycols, glycerine, dipropylene glycols, polyethylene glycols, polypropylene glycols; amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, 2-pyrrolidinone, other water miscible components, and mixtures thereof. When mixtures of water and water miscible organic liquids are selected as the liquid vehicle, the water to organic ratio may be in any effective range, and can, for example, be from about 100:0 to about 30:70, and more specifically, from about 97:3 to about 50:50, although the ratio may be outside these ranges. The nonwater component of the liquid vehicle generally serves as a humectant and which component possesses, for example, a boiling point higher than that of water, about 100° C. The colorant or pigment dispersion can be mixed with different humectants or solvents for generating ink jet inks including ethyleneglycol, diethyleneglycol, propyleneglycol, dipropylene glycol, polyethyleneglycols, polypropylene glycols, glycerine, trimethylolpropane, 1,5 pentanediols, 1,6 hexanediols, diols and triols containing about 2 to about 10 carbons; sulfoxides, for example dimethylsulfoxide, alkylphenyl sulfoxides; sulfones, for example sulfolane, dialkyl sulfones, alkyl phenyl sulfones, and the like; amides, for example N,N-dialkyl amides, N,N-alkyl phenyl amides, N-methylpyrrolidinone, N-cyclohexylpyrrolidinone, N,N-diethyltoluamide, and the like; ethers such as alkyl ether derivatives of alcohol, etherdiols, and ethertriols including butylcarbitol, alkyl polyethyleneglycols, and the like; urea, betaine, the thio (sulfur) derivatives of the aforementioned components of, for example thioethyleneglycol, trithioethyleneglycol, and the like; desired penetrants, such as water soluble polymers, pH buffer, biocides, and chelating agents, such as ethylene diamine tetra amine, EDTA and the like. In the inks, the liquid vehicle is generally present in an amount of from about 50 to about 99.5 percent by weight, more specifically, about 55 to about 95 percent by weight, and more specifically, from about 60 to about 90 percent by weight, although the amounts can be outside these ranges.

Examples of ink surfactants include alcohol surfactants, and more specifically, a mixture of secondary alcohols reacted with ethylene oxide, such TERGITOL 15-S™ series surfactants available from Union Carbide, polyethylene oxide, alkylphenoxy-polyethylene oxide such as TRITON X-100® available from Aldrich Chemical Company, polyethyleneoxide nonylphenyl ether available as IGEPAL™ from Aldrich Chemical Company, or as ANTAROX® from Rhone Poulenc, Su. The surfactants are utilized in an amount of from about 0.1 to about 5 percent by weight of the ink.

The colorant for the ink compositions of the present invention can be a pigment, or a mixture of one or more, for example from 1 to about 5 pigments, dyes and the like. The colorant can be black, cyan, magenta, yellow, red, blue, green, brown, mixtures thereof, and the like, and is more specifically, Levanyl carbon black obtained from Bayer, IJX-157 carbon black obtained from Cabot Corporation, Mukini JA Black 40M carbon black, Bonjet Black CW-1 and CW-X from Orient Chemical, or Pigment Black 7 Carbon Black Dispersions for ink jet inks obtained from Taisei Chemical Industries. Examples of suitable black pigments include various carbon blacks such as channel black, furnace black, lamp black, and the like. Colored pigments include red, green, blue, brown, magenta, cyan, and yellow particles, and mixtures thereof. Illustrative examples of magenta pigments include 2,9-dimethyl-substituted quinacridone and anthraquinone, identified in the Color Index as CI 60710, CI Solvent Red 19, and the like. Illustrative examples of suitable cyan pigments include copper tetra-4-(octadecyl sulfonamido) phthalocyanine, X-copper phthalocyanine pigment, listed in the color index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. The preferable pigment dispersions include carbon blacks, such as Hostafine Black (T and TS), Sunsperse 9303, and Levanyl Black A-SF. Of these, Levanyl Black A-SF is preferred in embodiments.

The colorant is present in the ink composition in various effective amounts and generally from about 1 to about 20 percent by weight, more specifically, from about 3 to about 10 percent by weight, more specifically, from about 4 to about 9 percent by weight, and yet more specifically, from about 5 to about 8 percent, although the amount can be outside of these ranges.

Polymeric additives can also be added to the inks to, for example, enhance the viscosity of the ink, which final viscosity is, for example, from about 1, and more specifically, about 15 centipoise to about 100 centipoise at a temperature of, for example, from about 25° C. to about 70° C., including water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines derivatized with polyethylene oxide and polypropylene oxide, such as the DISCOLE® series available from DKS International, Tokyo, Japan, the JEFFAMINE® series available from Texaco, Bellaire, Tex., and the like. Polymeric additives may be present in the ink of the present invention in amounts of, for example, from none or zero to about 10 percent by weight, more specifically, from about 0.001 to about 8 percent by weight, and more specifically, from about 0.01 to about 5 percent by weight, although the amounts may be outside these ranges.

Further, optional ink additives that may be present in the ink include biocides such as DOWICIL® 150, 200, and 75, benzoate salts, sorbate salts, and the like, present in an amount of from 0 to about 10 percent by weight, more specifically, from about 0.001 to about 8 percent by weight, and more specifically, from about 0.01 to about 4 percent by weight, although the amounts may be outside these ranges; penetration control additives such as N-methylpyrrolidinone, sulfoxides, ketones, lactones, esters, alcohols, butyl carbitol, benzyl alcohol, cyclohexylpyrrolidinone, 1,2-hexanediol, and the like, present in an amount of, for example, from 0 to about 50 percent by weight, and preferably from about 5 to about 40 percent by weight, although the amount can be outside these ranges; and pH controlling agents such as acids or, bases, phosphate salts, carboxylates salts, sulfite salts, amine salts, and the like, present in an amount of from 0 to about 1 percent by weight, preferably from about 0.001 to about 1 percent by weight, and more preferably from about 0.01 to about 1 percent by weight, although the amount can be outside these ranges, or the like. Other examples of suitable ink additives include those illustrated in U.S. Pat. Nos. 5,223,026 and 5,207,825, the disclosure of each of which is totally incorporated herein by reference.

The following Examples are provided. These Examples are intended to be illustrative only and are not intended to limit the scope of the present invention. Also, parts and percentages are by weight unless otherwise indicated.

EXAMPLE I

Synthesis of Aspartic Acid Containing Polyester-amine Resin

A sodiosulfonated random polyester-amine resin containing pendant amine groups and comprised of, on a mole percent basis, approximately 0.415 of terephthalate, 0.05 of aspartic acid, 0.35 of sodium sulfoisophthalate, 0.375 of 1,2-propanediol, 0.025 of diethylene glycol, and 0.100 of dipropylene glycol was prepared as follows.

In a one liter Parr reactor equipped with a bottom drain valve, a double turbine agitator, and a distillation receiver containing a cold water condenser were charged 368.6 grams of dimethylterephthalate, 52 grams of sodium dimethylsulfoisophthalate, 13.31 grams of aspartic acid, 285.4 grams of 1,2-propanediol, 285.4 grams of dipropylene glycol, 26.025 grams of diethylene glycol (1 mole excess of glycols), and 0.8 gram of butyltin hydroxide oxide as the catalyst. The reactor was then heated to 165° C. with stirring for 3 hours whereby 115 grams of distillate were collected in the distillation receiver, and which distillate was comprised of about 98 percent by volume of methanol and 2 percent by volume of 1,2-propanediol as measured with the ABBE refractometer available from American Optical Corporation. The mixture was then heated to 190° C. over a one (1) hour period, after which the pressure was slowly reduced from atmospheric pressure to about 260 Torr over a one hour period, and then reduced to 5 Torr over a 2 hour period with the collection of approximately 122 grams of distillate in the distillation receiver, and which distillate was comprised of approximately 97 percent by volume of 1,2-propanediol and 3 percent by volume of methanol as measured by the above ABBE device. The polymer resulting was then discharged through the bottom drain valve of the reactor onto a container cooled with dry ice to yield 460 grams of a 3.5 mole percent amine containing sulfonated-polyester resin, copoly(1,2-propylene-ethyleneoxyethylene-terephthalate)-copoly(copoly(1,2-propylene-ethyleneoxyethylene-sodio 5-sulfoisophthalate-copoly(copoly(1,2-propylene-ethyleneoxyethylene-aspartate). The sulfonated-amine containing polyester resin glass transition temperature was measured to be 54.1° C. (onset) utilizing the 910 Differential Scanning Calorimeter available from E.I. DuPont operating at a heating rate of 10° C. per minute. The softening point of the resin was measured to be 150.8°0 C. The number average molecular weight was measured to be 3,500 grams per mole, and the weight average molecular weight was measured to be 5,660 grams per mole using tetrahydrofuran as the solvent. All molecular weights were determined utilizing a Waters 510 HPLC pump, equipped with an autosampler, with samples of about 5 to about 10 grams being passed through 4 styragel HR1 columns calibrated using polystyrene standards and detection using HR 410 Waters DI detector.

EXAMPLE II

Process for the Preparation of a Cyan Flushed Pigmented Amine Containing Sulfonated Polyester Resin To a sample (200 grams) of the above prepared amine containing sulfonated molten polyester, greater than about 150° C., like 157° C., in an explosion proof stainless steel batch mixer equipped with a high power to volume ratio sigma blade was rapidly added 50 percent of a SUN FAST PIGMENT BLUE 15:3 wet presscake, available from Sun Chemicals, which was comprised of about 50 to about 70 percent cyan pigment solids by weight. Initial mixing was continued for 15 minutes, after which the remaining 50 percent of the presscake was slowly added to the reaction mixture over a 2 hour period. The water at the top of the reactor was decanted and the remaining water was removed by vacuum drying. The resulting pigmented polyester was heated to 175° C. and then discharged. The resulting composition of the dry pigmented resin prepared by this process was 85 percent of the amine containing sulfonated polyester of Example 1, and 15 percent of the above flushed cyan pigment.

EXAMPLE III

Process for the Preparation by Melt Extrusion of an Amine Containing Sulfonated Polyester Incorporated Organic Cyan Dye A sample (200 grams) of the sulfonated polyester-amine of Example I was brought into the melt (about 150° C. to about 175° C.) in a one liter Parr reactor and 5 grams of a blue/cyan organic soluble dye (Blue 590, BASF) was dissolved into the melt. The polymer was extruded to yield 203 grams of toner comprised of cyan dye (2.4 weight percent) and the Example I amine containing sulfonated polyester (97.6 weight percent).

EXAMPLE IV

Preparation of Inks from Pigmented Amine Containing Resins

The pigmented cyan amine containing sulfonated polyester of Example II was dispersed to submicron particles of about 75 nanometers in diameter (as measured using a MICROTRAK 150) by adding the pigmented solid slowly to 100 grams of distilled deionized warm water (about 70° C. to about 80° C.) to obtain a 5 percent by weight of a cyan pigment dispersion for ink formulations. Once the solution containing the pigmented or dyed materials was cooled to about 25° C., the cosolvents sulfolane, 30 weight percent, 2-pyrrolidinone, about 6 to about 7 weight percent, humectants, such as diethylene glycol, about 1 weight percent, and other ink additives, such as ink leveling agents like 1 weight percent of polyether-polymethyl-siloxane available from Goldschmidt and jetting aids, such as polyethylene oxide, 0.5 weight percent ($M_w$=20,000 Daltons obtained from Union Carbide) were added to the ink formulation. A smear reducing agent of finely meshed colloidal silica particles, LUDOX® obtained from E.I. DuPont and believed to contain from about 30 to about 45 percent of submicron $SiO_2$ and $Al_2O_3$ particles, was added in an amount of from about 1.5 weight percent. The resulting ink, which possessed a viscosity of from 2.2 centipoise and a pH of 6.7, is comprised of the above component.

Previous experience using microfluidized pigmented inks, about 400 nanometers in diameter, containing a prior art sulfonated polyester of copoly(1,2-propylene-diethylene sodio 5-sulfoisophthalate)-copoly-(1,2-propylene-diethylene-terephthalatephthalate) provided jetting (first drop latency values greater than 100 seconds) when printed out of the black or color slots in Xerox® (XJ6, or C8) or HP (1600c or 722 series) ink jet printers with shortfalls in wet smear (>0.4 change in optical density) and poor waterfastness (<90 percent of original optical density reading) on plain papers. In contrast and primarily in view of the small particle sizes (about 20 to about 300 nanometers) of the flushed pigment sulfonated polyester amine resin mixture of the present invention, microfluidizing is not necessary to achieve small particle sized inks. The resulting invention amine containing inks possessed in embodiment, reference the above Example IV ink, an excellent long first drop latency value of about 25 to about 50 percent more than a similar ink containing the above prior art polyester resin, and the ink waterfastness was about 95 percent primarily, it is believed, because of the incorporation of pendant amine and ammonium sites along the polymer backbone.

EXAMPLE V

Preparation of Inks from Dyed Amine Containing Resins

The cyan dye amine containing sulfonated polyester of Example III was dispersed into submicron particles of between about 50 to about 300 nanometers (as measured using a MICROTRAK 150) by adding this pigmented solid, 5 grams, slowly to 100 grams of warm water, about 70° C. to about 80° C., to obtain the desired pigmented polyester concentrations of between about 0.5 and about 40 weight percent dye for ink formulations. Once the solutions containing the pigmented or dyed materials were cooled, the cosolvents sulfolane (10 weight percent) and butyl carbitol (15 weight percent), and optionally humectants, such as diethylene glycol, 1 to about 2 weight percent, and jetting aids, such as 0.05 weight percent of polyethylene oxide, were added and mixed thoroughly. The ink resulting possessed a viscosity of 1.9 centipoise, 36 dynes/centimeter, and a pH of 68.

Jetting performance of the ink indicated a first drop latency or color slots in a Xerox® (XJ6, or C8) or an HP (1600c or 722 series) ink jet printer.

In view of the encapsulation of the organic dye by the sulfonated polyester amine, the dispersed dyed resins possess small particle sizes of about 20 to about 295 nanometers, and additional mechanical action, such as microfluidizing or sonification, can be used to achieve smaller particle sized inks. The amine containing inks jetting performance are expected to provide longer first drop latency values of about 25 to about 50 percent better than conventional inks, and the waterfastness of this amine ink is about 91 percent in view of the incorporation of pendant amine and ammonium sites along the polymer backbone that trap the dye and relative insolubility of the organic dye in the aqueous medium.

EXAMPLE VI

Preparation of Toners from and Containing 96 Percent by Weight of the Sulfonated Polyester Amine of Example I, and 4 Percent by Weight of Cyan 15:3 Pigment To a 3 liter reaction vessel equipped with a mechanical stirrer was added the sulfonated polyester amine resin (250 grams) of Example I, into water (2 liters) at 80° C. to yield an emulsion with particles therein, and wherein the particle diameter size was 70 nanometers. The resulting emulsion was then cooled down to about 50° C. to about 60° C., and 23 grams of FLEXIVERSE CYAN 15:3 pigment dispersion, available from Sun Chemical, and comprised of 45 percent by weight of the cyan pigment in water, such that the total amount of pigment in the toner was 4 percent by weight, was then added. The resulting mixture was then heated to 56° C., and to this was then added 500 milliliters of a 5 percent zinc acetate aqueous solution at a rate of about 1 milliliter per minute. The toner particle size of the mixture was then monitored until it reached a size (volume average diameter) throughout of 6 microns, after which the reaction mixture was quenched with 500 milliliters of cold water (about 2° C.). The contents of the above reaction vessel were then filtered through a 25 micron screen, and the toner product was filtered, redispersed in 2 liters of water for one hour, refiltered a second time, reslurried in 2 liters of water again, refiltered a third time and freeze dried to yield about 205 grams of the above titled toner with a particle size of 6 microns and GSD of 1.18 as measured by the Coulter Counter.

EXAMPLE VII

Preparation of Toners from and Containing Throughout 95 Percent by Weight of the Sulfonated Polyester Amine of Example I, and 5 Percent by Weight of Pigment Red 81:3 Pigment To a 3 liter reaction vessel equipped with a mechanical stirrer was added the sulfonated polyester amine resin (250 grams) of Example I into water (2 liters) at 80° C. to yield an emulsion with a particle diameter size of 70 nanometers. This emulsion was cooled down to about 50° C. to about 60° C., and 45 grams of FLEXIVERSE RED 81:3 pigment dispersion, available from Sun Chemical, and comprised of 30 percent by weight of red pigment in water, such that the total amount of pigment in the toner was 5 percent by weight, was then added. The mixture was then heated to 56° C., and to this was then added 500 milliliters of a 5 percent zinc acetate aqueous solution at a rate of about 1 milliliter per minute. The toner particle size of the mixture was then monitored until it reaches a size of 6 microns, after which the reaction mixture was quenched with 500 milliliters of cold water (about 2° C.). The contents of the reaction vessel was then filtered through a 25 micron screen. The toner product resulting was then filtered, redispersed in 2 liters of water for one hour, refiltered a second time, reslurried in 2 liters of water again, refiltered a third time and freeze dried to yield about 207 grams of the above titled toner with a particle volume average size of 6.1 microns and GSD of 1.22 as measured by the Coulter Counter.

EXAMPLE VIII

Preparation of Dry Toners from 87.5 Percent by Weight of the Sulfonated Polyester Amine of Example I, and 12.5 Percent by Weight of Pigment Yellow 17

To a 3 liter reaction vessel equipped with a mechanical stirrer was added the sulfonated polyester amine resin (250 grams) of Example I, into water (2 liters) at 80° C. to yield an emulsion with particles therein, and wherein the particle diameter size was 70 nanometers. This emulsion was cooled down to about 50° C. to about 60° C., and 157 grams of FLEXIVERSE YELLOW 17 pigment dispersion, available from Sun Chemical, and comprised of 38 percent by weight of yellow pigment in water, such that the total amount of the pigment in the toner was 12.5 percent by weight, was then added. The mixture was then heated to 56° C., and to this was then added 500 milliliters of a 5 percent zinc acetate aqueous solution at a rate of about 1 milliliter per minute. The toner particle size of the mixture was then monitored until it reached a size of 6 microns, after which the reaction mixture was quenched with 500 milliliters of cold water (about 20° C.). The contents of the reactor were then filtered through a 25 micron screen. The toner product resulting was then filtered, redispersed in 2 liters of water for one hour, refiltered a second time, reslurried in 2 liters of water again, refiltered a third time and freeze dried to yield about 212 grams of toner with a particle size of 6 microns and GSD of 1.23 as measured by the Coulter Counter.

EXAMPLE IX

Preparation of Dry Toners from 95 Percent by Weight of the Sulfonated Polyester Amine of Example I, and 5 Percent by Weight of Pigment Black 7

To a 3 liter reaction vessel equipped with a mechanical stirrer was added the sulfonated polyester amine resin (250 grams) of Example I, into water (2 liters) at 80° C. to yield an emulsion containing particles of a size of 70 nanometers. This emulsion was cooled down to about 50° C. to about 60° C., and 43.8 grams of FLEXIVERSE BLACK 7 pigment dispersion, available from Sun Chemical, and comprised of 30 percent by weight of black pigment in water, and such that the total amount of pigment in the toner was 5 percent by weight, was then added. The mixture was then heated to 56° C., and to this was then added 500 milliliters of a 5 percent zinc acetate aqueous solution at a rate of about 1 milliliter per minute. The toner particle size of the mixture was then monitored until it reached a size of 6 microns, after which the reaction mixture was quenched with 500 milliliter of cold water (about 2° C.). The contents of the reactor were then filtered through a 25 micron screen. The toner product resulting was then filtered, redispersed in 2 liters of water for one hour, refiltered a second time, reslurried in 2 liters of water again, refiltered a third time and freeze dried to yield about 212 grams of toner with a particle size of 6.2 microns and GSD of 1.20 as measured by the Coulter Counter.

Triboelectric Charging Properties of the Toners of Example VI to IX

Developers were prepared by mixing each of the above dry toners with a 65 micron diameter Hoaganese steel core coated with 1 percent by weight of a composite of a polymer of PMMA (polymethylmethacrylate with the conductive carbon black, CONDUCTEX SC ULTRA®, dispersed therein, about 20 weight percent) and conditioned overnight (about 18 hours) at 20 percent and 80 percent RH, and charged for 30 minutes on a roll mill. For 5 to 6 micron size toners, the toner concentration was 4 percent by weight of carrier. Triboelectric charge was measured by the known Faraday Cage blow-off process. The charging results for the toners of Examples VI to IX are shown in Table 1.

TABLE I

| Toner ID | Colorant | q/m, µCoul/g (20 percent RH) | q/m, µCoul/g (80 percent RH) | q/m RH ratio |
|---|---|---|---|---|
| Example VI | Cyan | −40 | −19 | 2.1 |
| Example VII | Red | −85 | −43 | 2.0 |
| Example VIII | Yellow | −35 | −19 | 1.8 |
| Example IX | Black | −22 | −11.3 | 2 |

Fusing Properties of the Toners of Examples VI to IX

Samples, about 100 grams, of the toners of Examples VI to IX were blended with a dry powder surface additive, 0.5 percent by weight of the toner, comprised of AEROSIL R812® (a surface-modified silica additive available from Degussa AG) for about 10 seconds using an SKM mill resulting in this additive being located on the surface of each of the toners to primarily improve flow for developability. There were then generated with the toners unfused images produced at 0.55 mg/cm$^2$ toner mass per unit area (TMA) on a Xerox® Color Xpressions (CX) paper, using a Xerox Docucolor® 40 printer. The unfused images were subsequently fused on a universal fusing fixture, wherein the fuser roll LB13 was comprised of an 8 micron thick outer layer of VITON®, a 42 micron thick middle layer of $Al_2O_3$-loaded VITON®, and a 2 millimeter thick inner layer of silicone rubber which rests on a 4 inch diameter core. Nip dwell time was 22 msec for images fused with the toners. The pressure roll temperature was retained at a constant 97° C. while the fuser roll temperature varied from about 120° C. to about 210° C. An amino fuser oil was applied to the roll and the average oil rate on top of the sheet varied from about 5 to about 10 mg/copy (see Table II).

TABLE II

| Toner ID | Peak Gloss (at 165° C.) $G_{max}$ | Temp at Gloss-50 $T_{G50}$ (° C.) | MFT (Crease-30) (° C.) | MFT (Crease-60) (° C.) | Hot Offset (HOT) ° C. |
|---|---|---|---|---|---|
| Example VI | 65 | 151 | 146 | 142 | >210 |
| Example VII | 67 | 152 | 140 | 133 | >210 |
| Example VIII | 65 | 155 | 138 | 134 | >210 |
| Example IX | 70 | 150 | 142 | 138 | >210 |

The results for peak gloss ($G_{max}$) values, shown in Table II, were high for each of the toners, ranging from about 65 to about 70 gloss units. The results for minimum fusing temperature (MFT) based on the crease area (either 30 or 60 units) were also summarized in Table II, and typically, were accurate to ±5° C. The values for MFT were found to range from about 138° C. to about 146° C. Furthermore, since all the toners displayed a Hot Offset value of greater than 210° C., the fusing latitudes for each of these toners, which is the difference between the Hot Offset temperature (HOT) and the minimum Fusing Temperature (MFT), were fairly wide.

Other modifications of the present invention may occur to those skilled in the art subsequent to a review of the present application, and these modifications, including equivalents thereof, are intended to be included within the scope of the present invention.

What is claimed is:

1. An alkali sulfonated polyester-amine resin generated from the reaction of an organic diol, and a mixture of an organic diacid, an alkali sulfonated diacid and an amino-organic diacid.

2. A sulfonated polyester-amine resin obtained from the reaction of an organic diol or organic diols, an organic diacid or organic diacids, an alkali sulfonated diacid or alkali sulfonated diacids, and an amino-organic diacid or amino-organic diacids.

3. A resin in accordance with claim 1 and of the formula

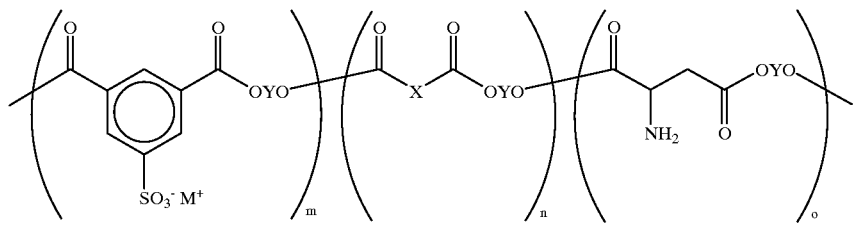

wherein M is hydrogen or an alkali metal; Y is an alkylene or an alkyleneoxyalkylene; X is an arylene or an alkylene; and m, n, and o represent the number of random segments.

4. A resin in accordance with claim 3 wherein the alkylene is ethylene, propylene, 1,2-propylene, butylene, 1,2-butylene, pentylene, hexylene, heptylene, octylene, cyclohexylene, or 1,4-dimethylcyclohexylene.

5. A resin in accordance with claim 3 wherein the arylene is 1,2-phenylene, 1,3-phenylene or 1,4 phenylene.

6. A resin in accordance with claim 3 wherein m is from about 10 to about 1,000, n is from about 50 to about 10,000, and o is from about 10 to about 1,000.

7. A resin in accordance with claim 1 and which resin possesses a weight average molecular weight $M_w$ of from about 5,000 to about 150,000 grams per mole.

8. A resin composition in accordance with claim 1 and which resin possesses weight average molecular weight of from about 10,000 to about 100,000 grams per mole.

9. A resin in accordance with claim 1 with a weight average molecular weight $M_w$ of from about 20,000 to about 125,000 grams per mole, or a weight average molecular weight $M_w$ of from 15,000 to about 100,000.

10. A resin in accordance with claim 1 with a number average molecular weight $M_n$ of from about 5,000 to about 50,000 grams per mole.

11. A resin in accordance with claim 1 with a number average molecular $M_n$ weight of from about 5,000 to about 30,000 grams per mole, a number average molecular weight $M_n$ of from about 5,000 to about 50,000 grams per mole, or a number average molecular weight $M_w$ of from about 5,000 to about 30,000 grams per mole.

12. A resin in accordance with claim 3 wherein said resin is comprised of from about 2 to about 10 mole percent of segment m, from about 30 to about 90 mole percent of segment n, and from about 2 to about 15 mole percent of segment o, and wherein the sum of segment m, n, and o is about 100 mole percent.

13. A resin in accordance with claim 1 wherein said alkali sulfonated diacid is sodio 5-sulfoisophthalic acid, potasio 5-sultoisophfhalic acid, sodio 2-sulfoterephthalic acid, potasio 2-sulfoterephthalic acid, dimethyl 5-sulfoisophthalate sodium salt, or dimethyl 5-sulfoisophthalate potassium salt.

14. A resin in accordance with claim 1 wherein said amino-organic diacid is aspartic acid, dimethyl aspartate, diethyl aspartate, or dipropyl aspartate.

15. A resin in accordance with claim 1 wherein the organic diacid is fumaric acid, malonic acid, itaconic acid, 2-methylitaconic acid, maleic acid, maleic anhydride, adipic acid, succinic acid, suberic acid, 2-ethyl succinic acid, glutaric acid, dodecylsuccinic acid, 2-methyladipic acid, pimelic acid, azelaic acid, sebacic acid, terephthalic acid, isophthalic acid, phthalic acid, 1,2-cyclohexanedioic acid, 1,3-cyclohexanedioic acid, 1,4-cyclohexanedioic acid, dialkyl esters wherein alkyl contains from about 2 to about 22 carbon atoms, and are esters of malonate, succinate, fumarate, itaconate, terephthalate, isophthalate, phthalate, cyclohexanedioate or mixtures thereof.

16. An alkali sulfonated polyester-amine resin composition in accordance with claim 1 wherein the organic diol is ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, hexylene glycol, heptalyne glycol, diethylene glycol, dipropylene glycol, cyclohexane diol, 2,2-dimethyl propane diol, neopentylene glycol, octylene glycol, cyclohexane dimethanol, diethylene glycol, dipropylene glycol, or mixtures thereof.

17. An alkali sulfonated polyester-amine resin obtained from the reaction of from about 0.45 to about 0.55 mole equivalents of an organic diol, of from about 0.35 to about 0.45 mole equivalents of an organic diacid, of from about 0.01 to about 0.15 mole equivalents of an alkali sulfonated diacid, and from about 0.01 to about 0.10 mole equivalents of an amino-organic diacid.

18. A resin in accordance to claim 1 comprised of copoly (1,2-propylene-terephthalate)-copoly(1,2-propylene-sodio 5-sulfo isophthalate)-copoly(1,2-propylene-aspartate), copoly(neopentylene-terephthalate)-copoly(neopentylene-sodio 5-sulfoisophthalate)-copoly (neopentylene-aspartate), or copoly(1,2-propylene-ethyleneoxyethylene-terephthalate)-copoly(1,2-propylene-ethyleneoxyethylene-sodio 5-sulfo isophthalate)-copoly(1,2-propylene-ethyleneoxyethylene-aspartate).

19. A resin of the formula wherein M is hydrogen or an alkali metal; Y is alkylene; X is an arylene or an alkylene; and m, n, and o represent the number of random segments.

20. A resin in accordance with claim 19 wherein said alkali is sodium, potassium, or lithium; Y alkylene possesses from about 2 to about 25 carbon atoms, X arylene possesses from about 7 to about 35 carbon atoms, and each of m, n, and o represent the number of random segments.

21. A resin in accordance with claim 19 wherein m is from about 10 to about 1,000, n is from about 50 to about 10,000, and o is from about 10 to about 1,000.

22. A resin in accordance with claim 3 wherein said alkali is sodium, potassium, or lithium; Y alkylene possesses from about 2 to about 25 carbon atoms, X arylene possesses from about 7 to about 35 carbon atoms, and each of m, n, and o represent the number of segments.

23. A resin in accordance with claim 3 wherein m is from about 10 to about 1,000, n is from about 50 to about 10,000, and o is from about 10 to about 1,000.

24. A resin in accordance with claim 3 wherein M is sodium, potassium or lithium; X is 1,4-phenylene, and Y is 1,2-propylene.

25. A resin in accordance with claim 24 wherein m is from about 10 to about 1,000, n is from about 50 to about 10,000, and o is from about 10 to about 1,000.

26. A resin in accordance with claim 3 wherein Y is alkylene.

27. A resin in accordance with claim 3 wherein Y is alkylene and X is arylene.

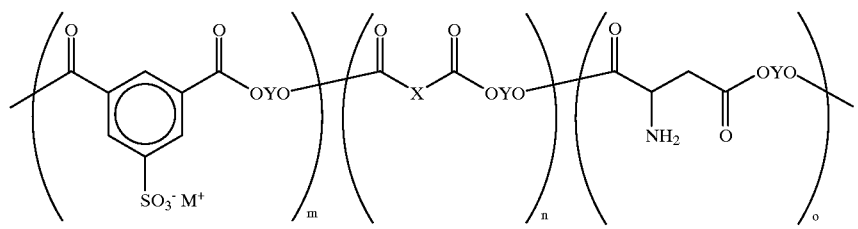

28. A resin in accordance with claim 3 wherein y is an alkyleneoxyalkylene.

* * * * *